United States Patent [19]
Schwegler et al.

[11] Patent Number: 6,029,694
[45] Date of Patent: Feb. 29, 2000

[54] DIAPHRAGM PRESSURE REGULATING VALVE ASSEMBLY

[75] Inventors: Helmut Schwegler, Pleidelsheim; Roland Hoepfl, Kempten; Wolfgang Bueser, Freiberg; Uwe Talmon, Muehlacker; Lorenz Drutu, Moeglingen, all of Germany

[73] Assignee: Robert Bosch GmbH, Stuttgart, Germany

[21] Appl. No.: 08/980,588

[22] Filed: Dec. 1, 1997

[30] Foreign Application Priority Data

Nov. 29, 1996 [DE] Germany .......................... 196 49 554

[51] Int. Cl.⁷ .................................................. F16K 31/12
[52] U.S. Cl. ........................................ 137/510; 137/493.6
[58] Field of Search ............................. 137/510, 493.6; 251/64

[56] References Cited

U.S. PATENT DOCUMENTS

| | | | |
|---|---|---|---|
| 2,139,395 | 12/1938 | Walker | 137/493.6 |
| 2,209,216 | 7/1940 | Wile | 137/510 |
| 2,508,010 | 5/1950 | Bower | 137/510 |
| 3,913,885 | 10/1975 | Greenwood | 251/64 |
| 4,424,738 | 1/1984 | Leighton | 137/510 |
| 4,542,852 | 9/1985 | Orth | 251/64 |
| 4,646,700 | 3/1987 | Tuckey | 137/510 |
| 5,076,230 | 12/1991 | Robinson | 137/510 X |
| 5,176,176 | 1/1993 | Lewis | 137/510 |
| 5,735,306 | 4/1998 | Olds | 251/64 |

FOREIGN PATENT DOCUMENTS

| | | |
|---|---|---|
| 0 392 313 | 10/1990 | European Pat. Off. . |
| 25 10 235 | 9/1977 | Germany . |
| 84 17 208 U | 4/1986 | Germany . |
| 34 46 324 | 7/1986 | Germany . |
| 34 35 248 | 6/1988 | Germany . |

OTHER PUBLICATIONS

Japanese Patent Abstract M–475 May 2, 1986—vol. 10/No. 118.

*Primary Examiner*—Denise L. Ferensic
*Assistant Examiner*—Joanne Y. Kim
*Attorney, Agent, or Firm*—Ronald E. Greigg; Edwin E. Greigg

[57] ABSTRACT

This pressure regulator prevents unpleasant vibration of the closing body. In the pressure regulator, a friction spring that is simple to mount is provided, by means of which the vibration of the closing body can be suppressed or reduced. The pressure regulator is intended in particular for fuel supply systems of motor vehicles that have an internal combustion engine.

3 Claims, 5 Drawing Sheets

DIAPHRAGM PRESSURE REGULATING VALVE ASSEMBLY

BACKGROUND OF THE INVENTION

The invention is based on a diaphragm pressure regulating valve assembly for a fuel supply.

The invention relates to a diaphragm pressure regulating valve assembly in which the pressure of a fuel in a pressure chamber is to be regulated. To that end, a diaphragm carrying a valve body assembly is provided. The diaphragm is acted upon by the pressure prevailing in the pressure chamber. If the pressure in the pressure chamber exceeds a certain value, then the valve body assembly lifts away from a stop, and an outlet opening is opened for the outflow of fuel from the pressure chamber. In order that the outlet opening will be closed when the pressure in the pressure chamber is below a certain value, the diaphragm or the valve body assembly is urged in the closing direction by a closing force.

When the outlet opening is closed, then as a consequence of the fuel flowing into the pressure chamber the pressure in the pressure chamber rises until the outlet opening is opened, and then drops again as a consequence of the outflow of fuel from the pressure chamber into the outlet opening. This can cause rapid vibration of the valve body assembly. This vibration of the valve body assembly can generate an irritating noise in some cases. The vibration of the valve body assembly is increased by the fact that in some cases the fuel reaches the pressure chamber with pressure pulses. There is a risk that by undamped vibration of the valve body assembly, the amplitudes of the vibrations can build up, especially when a resonant effect is also involved.

The vibration of the valve body assembly can cause an irritating noise, and when the diaphragm pressure regulating valve assembly is installed in a fuel supply system, it can also lead to functional disturbances in the fuel supply system. As a result of the vibration of the valve body assembly of the diaphragm pressure regulating valve assembly, pressure pulsations in the fuel supply system can arise or be reinforced.

OBJECT AND SUMMARY OF THE INVENTION

The diaphragm pressure regulating valve assembly according to the invention has the advantage over the prior art that problematic vibration of the valve body assembly, and noises and functional disturbances caused as a result, such as pressure pulsations in the fuel supply system, are avoided.

For producing the diaphragm pressure regulating valve assembly with the friction device, no significant additional expense is advantageously needed, by comparison with a diaphragm pressure regulating valve assembly without a friction device. The friction device is advantageously a simple and effective provision for damping vibrations of the valve body assembly.

By the characteristics recited herein, advantageous further features of and improvements to the diaphragm pressure regulating valve assembly defined are possible.

The friction device can advantageously be made very easily and simply by means of a spring assembly braced at one end on the housing device and at the other end on the valve body assembly. Because of its elasticity, the spring assembly provides a provision that exhibits virtually no wear.

The diaphragm pressure regulating valve assembly can advantageously be produced especially simply if the spring assembly is connected for motion on one end to the valve body assembly and on the other, upon a motion of the valve body assembly relative to the housing device, rubs against the housing device.

The diaphragm pressure regulating valve assembly can advantageously be made especially simply if the spring assembly is provided between one valve spring end of a valve closing spring and the valve body assembly. With the valve closing spring, the spring assembly can be coupled for motion to the valve body assembly without additional expense.

The invention will be better understood and further objects and advantages thereof will become more apparent from the ensuing detailed description of preferred embodiments taken in conjunction with the drawings.

DESCRIPTION OF THE PREFERRED EMBODIMENTS

The diaphragm pressure regulating valve assembly embodied according to the invention is used to regulate a pressure of a fuel. By way of example, the fuel is pumped out of a supply tank into a fuel-carrying line by a fuel pump. Via fuel valves or injection valves, the fuel passes from the fuel-carrying line into an internal combustion engine. Because the fuel pump pumps more fuel into the fuel-carrying line than the fuel valves draw from the fuel-carrying line, the pressure in the fuel-carrying line would rise until it is unacceptably high, if there is no pressure limitation. It is very important that the pressure in the fuel-carrying line adhere very precisely to a certain value. The diaphragm pressure regulating valve assembly is provided for this purpose. By way of example, the diaphragm pressure regulating valve assembly may be disposed in the region of the tank or in the region of the engine. The diaphragm pressure regulating valve assembly is for instance an easily produced pressure regulator, in which a diaphragm is fastened at its outer circumference to a crimped connection between two sheet-metal housing parts of a housing of the pressure regulator. In its middle, the diaphragm holds a valve body assembly. The diaphragm defines a pressure chamber. Protruding into the pressure chamber is for instance a regulator nozzle that communicates with the housing. An outlet opening leads through the regulator nozzle. If the pressure in the pressure chamber rises, then the valve body assembly lifts from a stop provided on the regulator nozzle, and the fuel can flow out of the pressure chamber into the outlet opening. In order that the valve body assembly will rest on the stop when the pressure in the pressure chamber is below a certain value, the valve body assembly is urged against the stop by a closing force. By way of example, the closing force can be generated by a valve closing spring. Instead of the valve closing spring, a force can also be provided that the diaphragm is acted upon by a counter pressure on a side remote from the pressure chamber. A combination of the valve closing spring and a counterpressure, which together produce the closing force, is equally possible.

Since the valve body assembly is urged against a stop acting as a valve seat, the diaphragm pressure regulating valve assembly belongs to the category of seat valves.

The valve body assembly may be embodied in various ways. For instance, the valve body assembly may have a ball carried by the diaphragm and supported on the regulator nozzle. It may also be provided that the outlet opening extends through the valve body assembly.

By way of example, the diaphragm may also be fastened into a hydraulic block, and the housing is formed by the hydraulic block, for instance. It can also be provided that the supply tank for the fuel forms the housing, or part of the housing, of the pressure regulator or of the diaphragm pressure regulating valve assembly.

Figure 1:
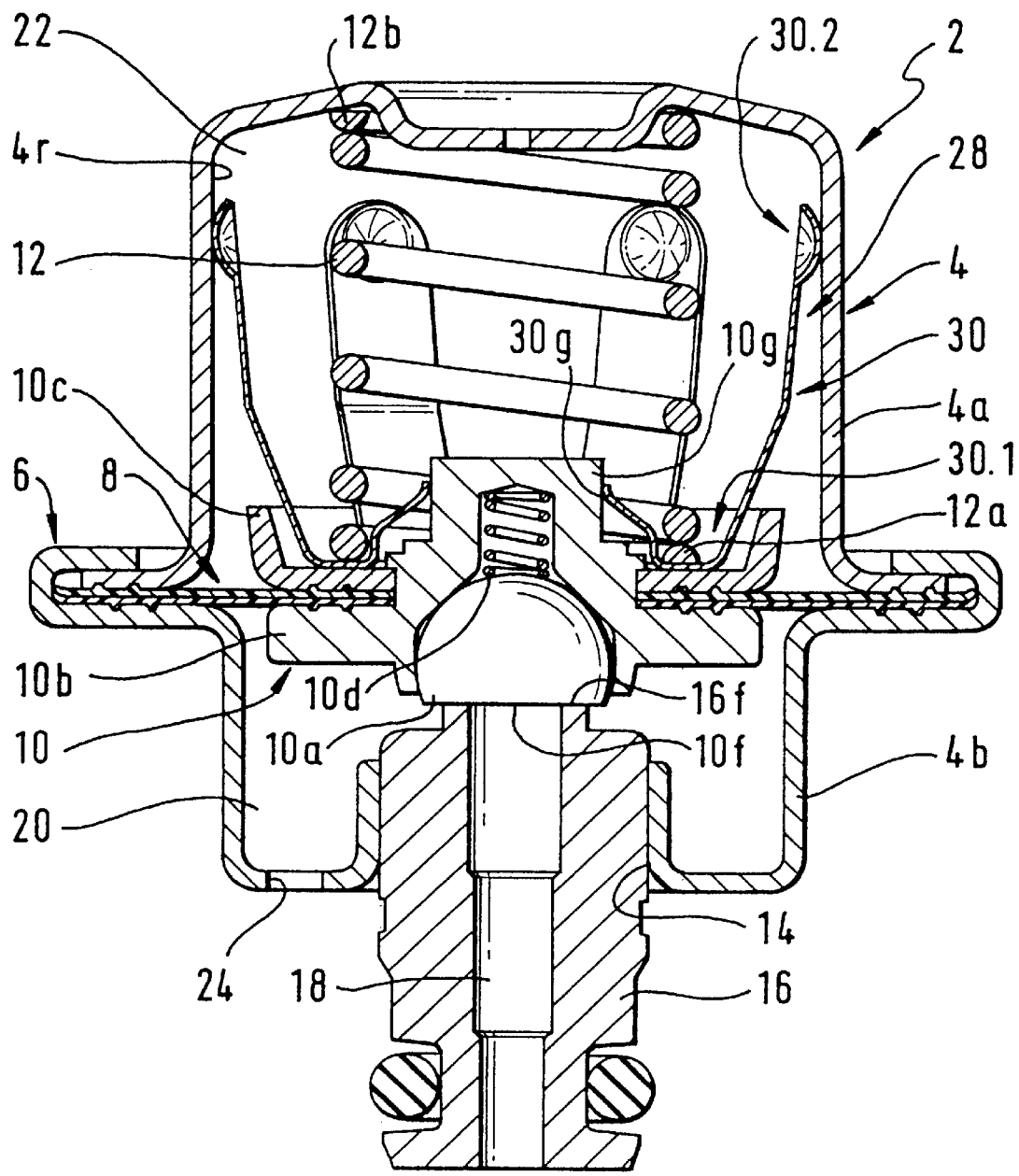
FIG. 1 shows a first exemplary embodiment.

FIG. 1 shows a preferred, especially advantageous selected exemplary embodiment of a diaphragm pressure regulating valve assembly. For reasons of simplicity, the diaphragm pressure regulating valve assembly will hereinafter be called a pressure regulator and identified by reference numeral 2.

A housing device of the diaphragm pressure regulating valve assembly or pressure regulator 2 will hereinafter be called simply a housing 4, for the sake of simplicity. The housing 4 is composed of a first housing part 4a and a second housing part 4b. The two housing parts 4a, 4b are held together by a crimped connection 6. A diaphragm 8 is located in the housing 4. The diaphragm 8 may be put together from multiple parts. In the exemplary embodiment shown in FIG. 1, the diaphragm 8 includes two elastic plastic plates and a fabric layer between them.

A valve body assembly 10 is firmly joined to the diaphragm 8 in the middle region thereof. By way of example, the valve body assembly 10 includes a closing body 10a, a retaining body 10b, a spring plate 10c, and an auxiliary spring 10d. A valve closing spring 12 is disposed in the first housing part 4a. The valve closing spring 12 has a first valve spring end 12a and a second valve spring end 12b.

The second housing part 4b of the housing 4 has a retention opening 14, into which a regulator nozzle 16 is inserted and held by the housing part 4b. An outlet opening 18 leads through the regulator nozzle 16. In the second housing part 4b, a pressure chamber 20 is created. On the side of the diaphragm 8 remote from the pressure chamber 20, there is a space, hereinafter called a valve chamber 22, in the first housing part 4a. An inlet opening 24 leads through the second housing part 4b into the pressure chamber 20.

A fuel pump, not shown, pumps fuel out of the supply container into a fuel-carrying line, not shown for the sake of simplicity, in which the pressure regulator 2 is also installed. Fuel valves, not shown, carry the fuel out of the fuel-carrying line into an internal combustion engine, not shown. Excess fuel not drawn off by the fuel valves passes through the inlet opening 24 into the pressure chamber 20. When the pressure in the pressure chamber 20 has reached a certain value, then a valve face 10f provided on the closing body 10a lifts away from a stop provided on the regulator nozzle 16. The stop on the regulator nozzle 16 will hereinafter be called a valve seat 16f. The outlet opening 18 leads from the face end of the regulator nozzle 16 that carries the valve seat 16f into a return line, not shown, the return leads back to the supply container. If the pressure of the fuel in the pressure chamber 20 is below a certain value, then the valve face 10f is resting on the valve seat 16f, and a flow course for the fuel out of the pressure chamber 20 into the outlet opening 18 is then interrupted. If the pressure of the fuel in the pressure chamber 20 is above a certain value, then the valve is opened and flow course passes through, between the valve face 10f and the valve seat 16f, from the pressure chamber 20 into the outlet opening 18. Depending on the amount of fuel flowing into the pressure chamber 20, the valve face 10f of the valve body assembly 10 lifts more or less far from the valve seat 16f connected to the housing 4. The valve body assembly 10 executes only fairly short strokes, because even at short strokes, large quantities of fuel can flow into the outlet 18.

In the pressure regulator 2 embodied according to the invention, there is a friction device. In the selected exemplary embodiment shown in FIG. 1, the friction device includes a spring assembly 28. The spring assembly 28 may encompass one spring or multiple springs. In the preferably selected exemplary embodiment, the spring assembly 28 comprises one spring, which for the sake of simplicity will hereinafter be called the friction spring 30.

Figure 2:
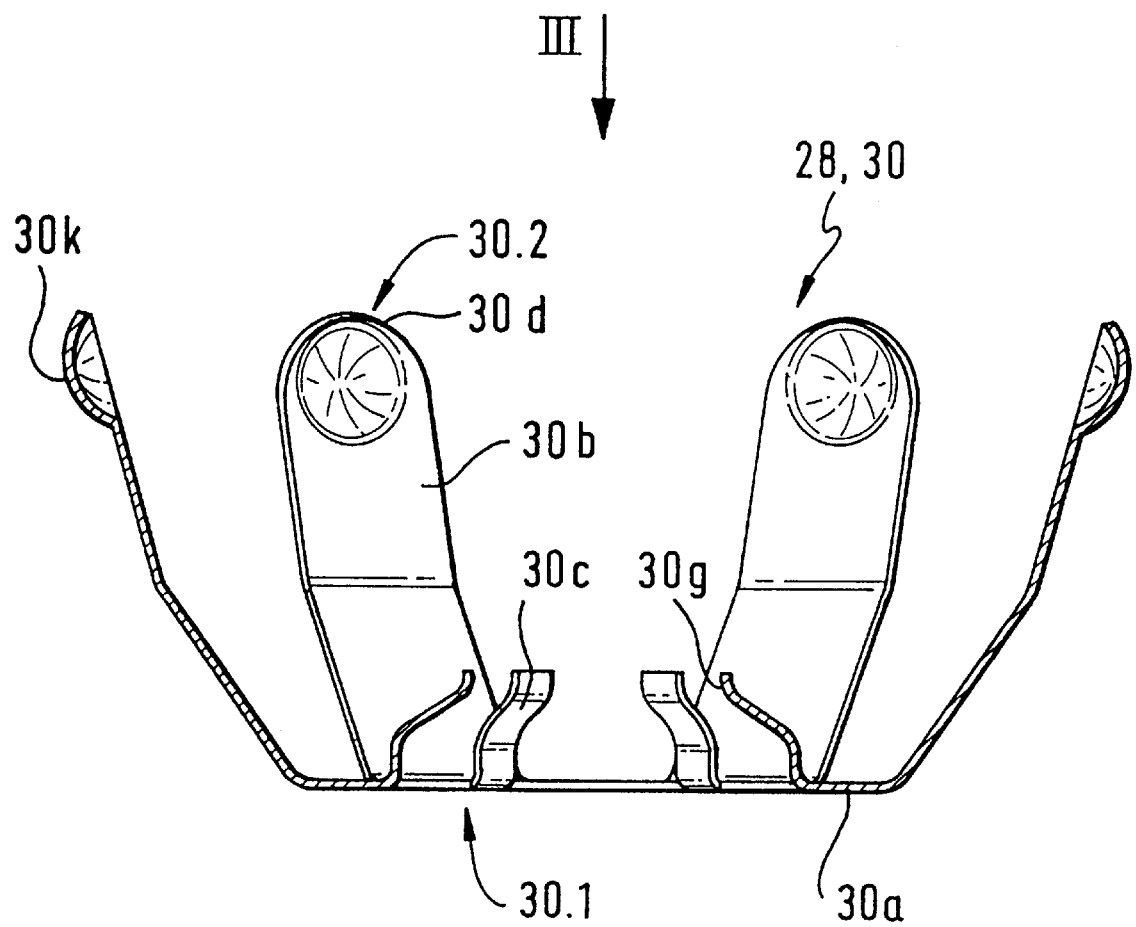
FIGS. 2 and 3 show details seen from different directions.
Figure 3:
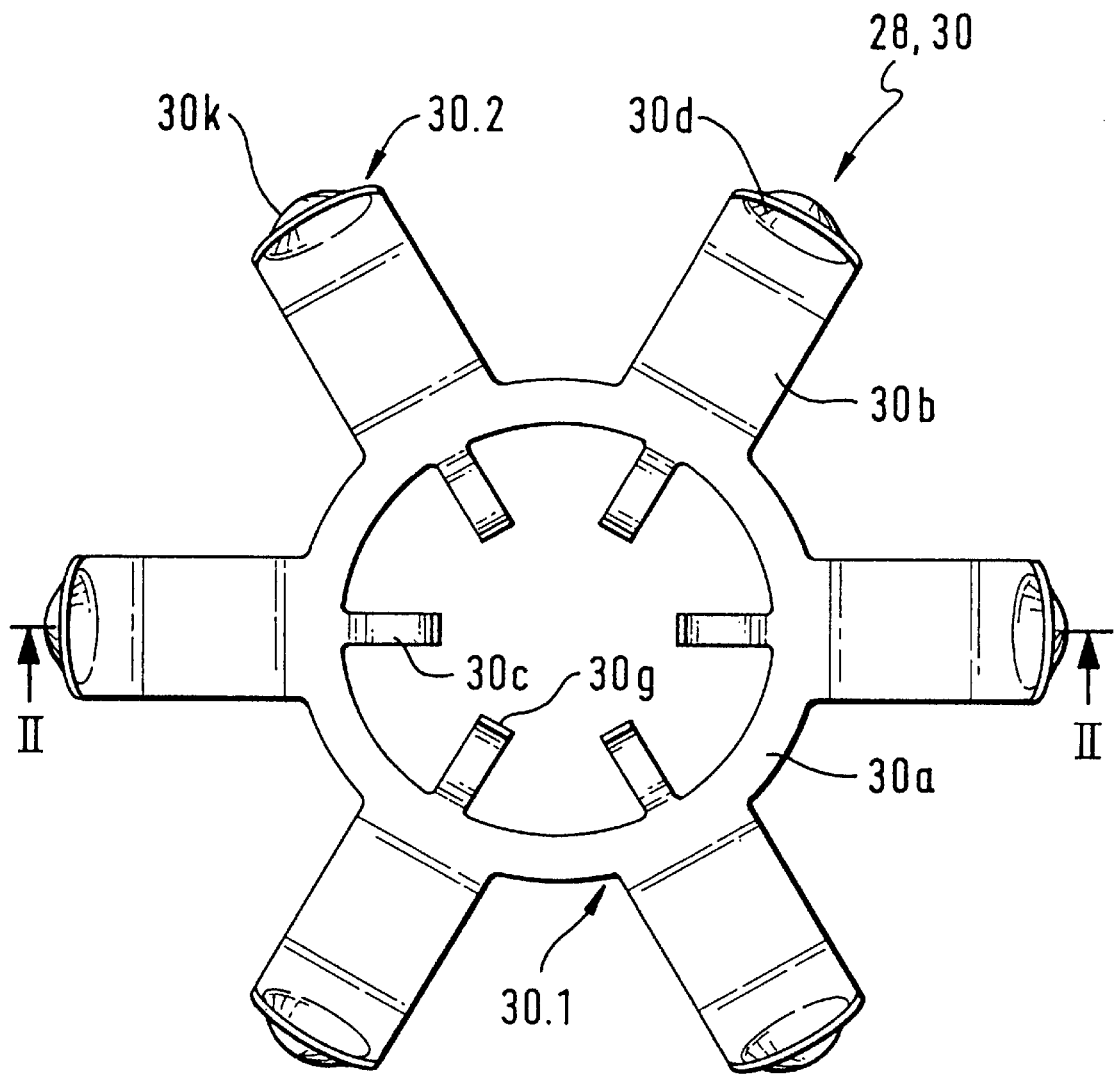

FIGS. 2 and 3 show examples, on a different scale, of the friction spring 30 seen from different directions.

In all the drawing figures, elements that are the same or function the same are provided with the same reference numerals. Unless noted to the contrary or otherwise shown in the drawing, what is mentioned and shown in conjunction with one of the drawing figures applies to the other exemplary embodiments as well. Unless the description says otherwise, the details of the various exemplary embodiments can be combined with one another.

FIG. 2 shows the same sectional plane of the friction spring 30 as FIG. 1. This sectional plane is marked II—II in FIG. 3.

FIG. 3 shows the friction spring 30 from the direction marked III in FIG. 2.

The friction spring 30 has an annular region 30a. Six spring prongs shown in the exemplary embodiment and hereinafter called spring arms 30b, protrude from the annular region 30a. Six tabs 30c, then, protrude inward from the annular region 30a. The region having the annular region 30a and the tabs 30c will hereinafter be called the first end region 30.1 of the friction spring 30 or spring assembly 28. On the spring arms 30b, there are ends 30d remote from the annular region 30a. The region of the friction spring 30 having the ends 30d will hereinafter be called the second end region 30.2 of the friction spring 30 or spring assembly 28.

The valve closing spring 12 urges the valve body assembly 10 in the closing direction (FIG. 1). The first valve spring end 12a is braced on the spring plate 10c. The annular region 30a (FIG. 3) is so broad in the radial direction that there is enough space available for the first valve spring end 12a of the valve closing spring 12. The annular region 30a of the friction spring 30 is disposed between the first end 12a of the valve closing spring 12 and the spring plate 10c of the valve body assembly 10. Since the valve closing spring 12 presses with initial tension against the spring plate 10c, the friction spring 30 is held without play against the valve body assembly 10. As a result, at no additional expense, a motion-wise coupling of the friction spring 30 to the valve body assembly 10 is achieved via the six tabs 30c.

A cylindrical shoulder 10g is provided (FIG. 1) and protrudes into the valve chamber 22 on the retaining body 10b of the valve body assembly 10. Each of the tabs 30c of the friction spring 30 have an end, remote from the annular region 30a, which serves as a support and is therefore hereinafter called a support 30g. Where the tabs 30c protrude from the annular region 30a, they are bent at an angle and extend obliquely some distance in the axial direction (relative to the longitudinal axis of the pressure regulator 2). The ends of the tabs 30c that form the support 30g yield inward (from a radial standpoint). The support 30g of the friction spring 30 presses, with initial tension against the cylindrical shoulder 10g of the valve body assembly 10. As a result, in a very simple way, the friction spring 30 can be mounted on the valve body assembly 10 in the course of the assembly of the pressure regulator 2, and the friction spring 30 is held on the valve body assembly without slipping off. This means that the effort and expense for assembling the pressure regulator 2 is not significantly increased by the friction spring 30. The valve closing spring 12 can be built in the usual way as with previous pressure regulators, without in any way being made more difficult by the friction spring 30. The support 30g serves also as a support for the radial force component introduced into the friction spring 30 via the spring arms 30b.

At the transition from the annular region 30a to the spring arms 30b, the spring arms 30b are bent at an angle, so that the spring arms 30b extend obliquely outward but also extend in the axial direction (with regard to the longitudinal axis of the pressure regulator 2). The first housing part 4a of the housing 4 has a cylindrical region with an inside face. The second end region 30.2 of the friction spring 30 or spring assembly 28 is braced against this inner face. Upon a motion of the valve body assembly 10 in the longitudinal direction (in terms of the pressure regulator 2), the friction spring 30, with its second end region 30.2, rubs against the inside face of the housing part 4b. This inside face will therefore hereinafter be called the friction face 4r (FIG. 1). The friction spring 30 is dimensioned such that the end 30d (FIG. 2) of the friction spring 30 presses with initial tension in the radial direction against the friction face 4r (FIG. 1). Because it suffices for the friction spring 30 to generate merely a slight frictional force, oriented counter to the motion of the valve body assembly 10, it also suffices for the spring arms 30b to press against the friction face 4r with relatively low elastic prestressing. Even with a relatively slight frictional force, an adequate action that hinders the motion of the valve body assembly 10 and thus has a damping effect is attainable. Since there is enough space in the valve chamber 22 (FIG. 1) next to the valve closing spring 12, the spring arms 30b can be made fairly long and hence quite elastic, without causing any problem; as a result, the spring arms 30b can yield fairly well and can thus very easily compensate for changes caused by wear or dimensional tolerances dictated by production factors, without significant change in the frictional force.

The friction spring 30 can be produced in a simple way by stamping and subsequent or simultaneous bending of resilient sheet steel. However, it is also possible to produce the entire friction spring 30 as a plastic injection molded part. To prevent a possible sharp burr of the friction spring 30 from harming the friction face 4r, so-called thimbles 30k (FIGS. 2, 3) are provided on the second end region 30.2 of the friction spring 30. The thimbles 30k are shaped such that a smooth, curved surface of the friction spring 30 presses with elastic prestressing against the friction face 4r provided on the housing 4. The thimbles are somewhat semi-spherical.

Figure 4:
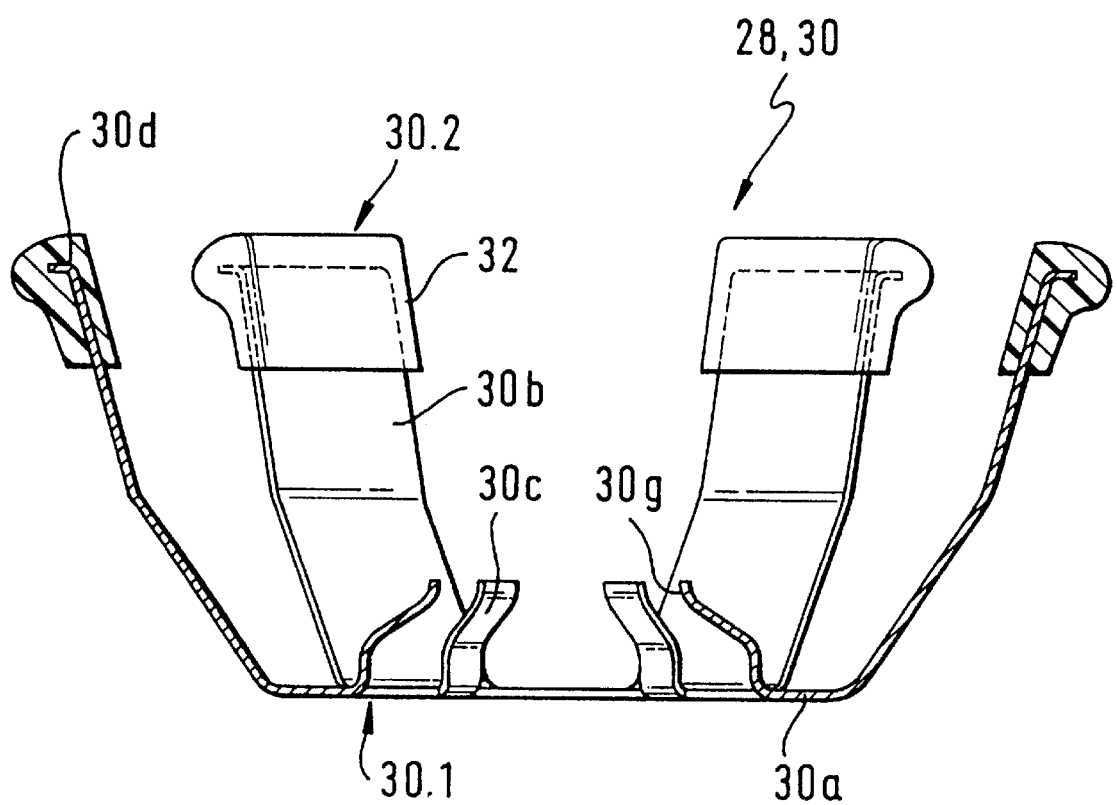
FIG. 4 shows a detail of a further exemplary embodiment.

FIG. 4 as an example shows a selected, modified friction spring 30 or spring assembly 28. In FIG. 4, the section line of the friction spring 30 is the same as for the friction spring 30 shown in FIG. 2.

In the friction spring 30 shown in FIG. 4, there is one plastic piece 32 on each of the ends 30d of the spring arms 30 remote from the annular region 30a. In the preferably selected exemplary embodiment, the ends 30d of the friction spring 30 are spray-coated with plastic. This spray-coating forms the plastic pieces 32. For the sake of good bonding of the spray-coating to the spring arms 30, the ends 30d are bent inside the spray-coating.

With the plastic piece 32, for which a material can be selected that has a constant coefficient of friction and low wear, a constant friction is obtained, to suit the needs, between the friction spring 30 and the housing 4. The plastic piece 32 can be selected such that the static friction between the friction spring 30 and the housing 4 is no greater, or only insignificantly greater, than the sliding friction. The advantage is thus obtained that at the beginning of a motion, no increased breakaway force, or as good as no increased breakaway force, has to be expended, and at the onset of a motion and during the motion a largely constant coefficient of friction is obtained.

In addition to the plastic piece 32 or instead of the plastic piece 32 on the spring arms 30b, the cylindrical inside face of the housing part 4a may also be provided with a plastic, along which the second end region 30.2 of the friction spring 30 slides upon a motion of the valve body assembly 10.

Figure 5:
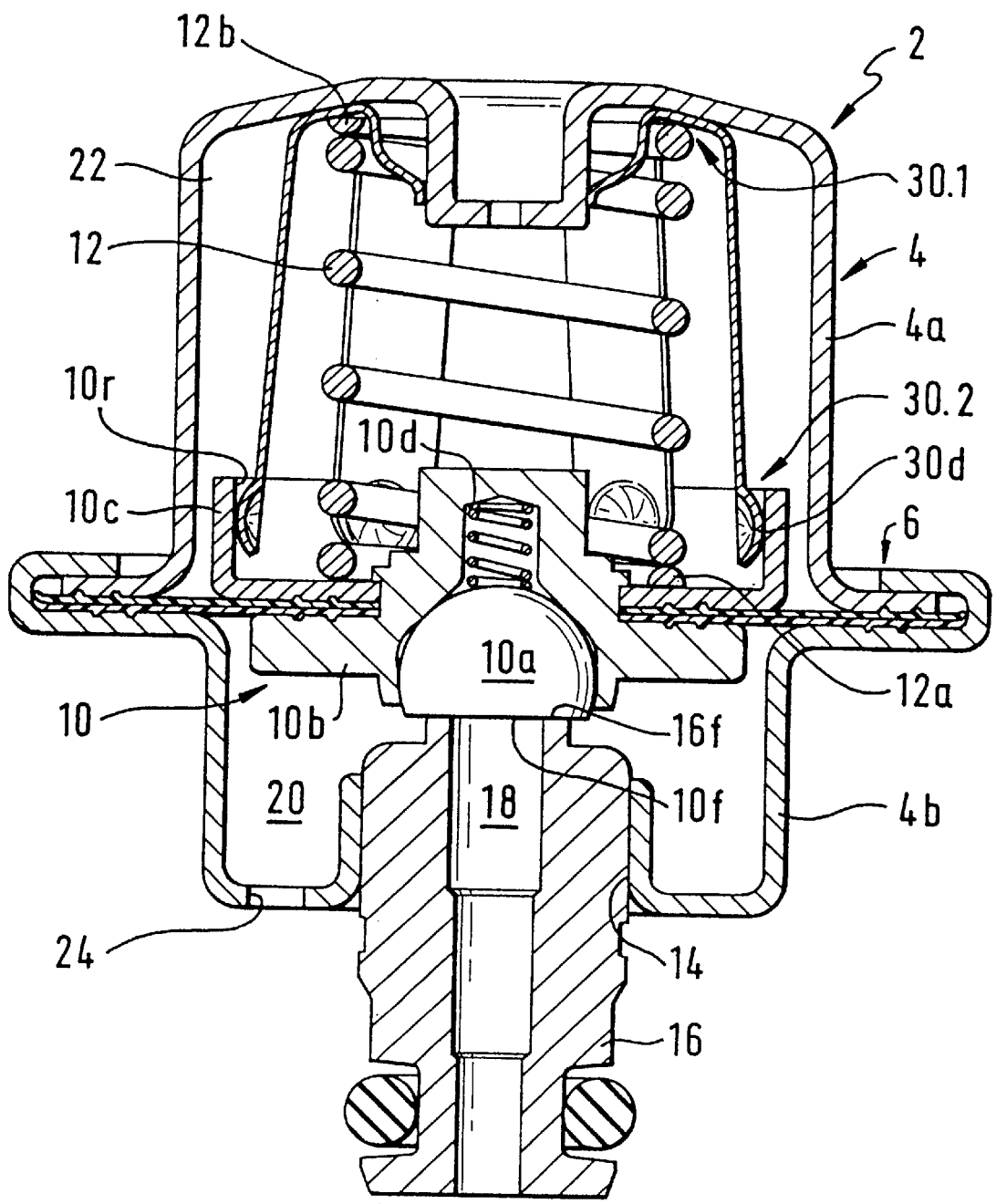
FIG. 5 shows a further exemplary embodiment.

FIG. 5 shows a further, especially selected, advantageous exemplary embodiment. The exemplary embodiment shown in FIG. 5 is a sectional view taken along the same line as that of FIG. 1.

In this exemplary embodiment, the first end region 30.1 of the friction spring 30 is joined to the housing 4 of the housing device, and the second end region 30.2 of the friction spring 30, upon a motion of the valve body assembly 10, rubs against an inside face of the spring plate 10c of the valve body assembly 10. This inside face will here be called a friction face 10r. In this exemplary embodiment, the friction spring 30 is provided with two spring arms 30b.

The second end 12b of the valve closing spring 12 presses the first end region 30.1 of the friction spring 30 against a substantially radially extending inside face of the housing 4 (FIG. 5) which face encloses the valve chamber 22.

In this exemplary embodiment as well, the tabs 30 in the first end region 30.1 may be embodied such that they are resiliently prestressed against a cuff provided on the housing part 4a, and as a result, even before the valve closing spring is installed during the assembly of the pressure regulator 2, the friction spring 30 holds firmly to the housing part 4a without falling out. As a result, the friction spring 30 presents no additional difficulty during the assembly of the pressure regulator 2.

The friction spring 30 shown in FIG. 5 is once again preferably of resilient sheet steel, or may very simply be a plastic injection molded part. However, it is possible to spray-coat the ends 30d with plastic in the second end region 30.2, and as a result here as well the plastic piece 32 shown in FIG. 4 can be attached very simply to the friction spring 30.

The foregoing relates to preferred exemplary embodiments of the invention, it being understood that other variants and embodiments thereof are possible within the spirit and scope of the invention, the latter being defined by the appended claims.

We claim:

1. A diaphragm pressure regulating valve assembly for a fuel supply system for regulating a pressure of a fuel in a pressure chamber of a housing, comprising a diaphragm fastened in said housing, a valve body assembly (10) supported by said diaphragm (8) defining the pressure chamber (20) in a second housing part (4b), a pressure in the pressure chamber acts upon the diaphragm with an opening force acting in an opening direction, for opening an outlet opening (18) of an outlet which extends outwardly of the housing part (4b) in order to release fuel from the pressure chamber (20), and wherein the valve body assembly (10) is acted upon by a closing force spring (12) acting in the closing direction of said body assembly for closing the outlet opening (18), and between a spring housing device (4, 4a) and the valve body assembly (10), a friction device (4r, 10r, 28, 30) is provided that counteracts a motion of the valve body assembly (10), the friction device includes a spring assembly (28, 30), the spring assembly includes a first end region (30.1) and a second end region (30.2), the first end region is braced against the valve body assembly (10) and secured in place by the closing force spring (12) and the second end region (30.2) is braced against the housing device (4, 4a), the spring assembly (28, 30) has an annular region (30a) on said first end region (30.1) the second end region (30.2) of the spring assembly (28, 30) is formed by a plurality of spring arms (30b, 30d) that protrude from a fastened annular region (30a), and said spring arms are radiused on one end to press with initial tension radially outward against the housing apparatus (4, 4a, 4r) and rubs against an inside surface of the spring housing device (4, 4a, 4r) upon a motion of the valve body assembly (10), the valve closing force (12) is formed at least in part by a valve closing spring (12) secured in the valve housing between the valve body assembly (10, 10c) and the valve housing device (4, 4a), the valve closing spring (12) has a first valve spring end (12a), the first valve spring end (12a) urges the valve body assembly (10, 10a) in the closing direction, the annular region (30a) of the first end region (30.1) of the spring assembly (28, 30) is located between the first valve spring end (12a) and the valve body assembly (10, 10c), and the valve closing spring 12 urges the annular region (30a) with an initial tension against the valve body assembly (10 10c), and a plurality of tabs (30c, 30g) that are braced radially inward on the valve body assembly.

2. A diaphragm pressure regulating valve assembly in accordance with claim 20, wherein the tabs (30c) act as a guide for a first valve spring end (12a) of the valve closing spring (12).

3. A diaphragm pressure regulating valve assembly for a fuel supply system for regulating a pressure of a fuel in a pressure chamber of a housing, comprising a diaphragm fastened in said housing, a valve body assembly (10) supported by said diaphragm (8) defining the pressure chamber (20), a pressure in the pressure chamber acts upon the diaphragm with an opening force acting in an opening direction, for opening an outlet opening (18) in order to release fuel from the pressure chamber (20), and wherein the valve body assembly (10) is acted upon by a closing force acting in the closing direction of said valve body assembly for closing the outlet opening (18), and between a spring housing device (4, 4a) and the valve body assembly (10), a friction device (4r, 10r, 28, 30) is provided that counteracts a motion of the valve body assembly (10), the friction device includes a spring assembly (28, 30) the spring assembly includes a first end region (30.1) and a second end region (30.2), the first end region is braced against the valve body assembly (10) and the second end region (30.2) is braced against the housing device (4, 4a), the second end region (30.2) of the spring assembly (28, 30) rubs against an inside surface of the housing device (4, 4a, 4r) which has an inner circumference oriented crosswise to a direction of a motion of the valve body assembly (10) which has a housing radius, the spring assembly (28, 30) has at least one spring arm (30b) that is radially resilient toward the housing device (4, 4a, 4r), and on the at least one spring arm (30b) includes an arched dome (30k), said arched dome has a radius oriented crosswise to a direction of motion of the valve body assembly (10) and presses against a housing radius of the housing device (4, 4a, 4r), and the dome radius is shorter than the housing radius as viewed crosswise to a direction of motion of the valve body assembly.

* * * * *